United States Patent
Myron et al.

(10) Patent No.: US 10,820,274 B2
(45) Date of Patent: Oct. 27, 2020

(54) SYSTEMS AND METHODS FOR TESTING POWER CONSUMPTION OF ELECTRONIC DEVICES

(71) Applicant: T-Mobile USA, Inc., Bellevue, WA (US)

(72) Inventors: Peter P. Myron, Renton, WA (US); Michael J. Mitchell, North Bend, WA (US); Samson Kim-Sun Kwong, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 207 days.

(21) Appl. No.: 15/626,899

(22) Filed: Jun. 19, 2017

(65) Prior Publication Data

US 2018/0368072 A1    Dec. 20, 2018

(51) Int. Cl.
*H04W 52/02* (2009.01)
*H04W 24/08* (2009.01)

(52) U.S. Cl.
CPC ... *H04W 52/0264* (2013.01); *H04W 52/0216* (2013.01); *H04W 52/0219* (2013.01);
(Continued)

(58) Field of Classification Search
CPC ......... H04W 52/0264; H04W 52/0267; H04W 24/08
See application file for complete search history.

(56) References Cited

U.S. PATENT DOCUMENTS

| | | | |
|---|---|---|---|
| 7,274,199 B2* | 9/2007 | Koivukangas | H04W 24/00 324/750.3 |
| 7,356,679 B1* | 4/2008 | Le | G06F 9/45558 713/1 |

(Continued)

OTHER PUBLICATIONS

D. Pandiyan, S. Lee and C. Wu, "Performance, energy characterizations and architectural implications of an emerging mobile platform benchmark suite—MobileBench," 2013 IEEE International Symposium on Workload Characterization (IISWC), Portland, OR, 2013, pp. 133-142. doi: 10.1109/IISWC.2013.6704679 (Year: 2013).*

(Continued)

*Primary Examiner* — Jamaal Henson
(74) *Attorney, Agent, or Firm* — Lee & Hayes, P.C.

(57) ABSTRACT

Systems and methods for testing power consumption in user equipment (UE). The system can include devices detecting changes in power consumption due to updates in hardware, software, or both. The system can test multiple UEs to create baseline consumption measurements to detect anomalies between UEs. The system can include individual power monitoring for each UE in a "UE farm." The system can use a workstation and a microcontroller to manage multiple UEs to perform tasks at the same time or at predetermined intervals. The system can provide benchmark testing for UEs to identify anomalies. The method can instruct multiple UEs in the UE farm to perform a particular function, run a baseline set of applications, or test new applications to identify changes in consumption caused by applications, updates, or UEs. The systems and methods can provide a standardized means for rating power consumption on mobile electronic equipment.

18 Claims, 7 Drawing Sheets

(52) U.S. Cl.
CPC ... *H04W 52/0229* (2013.01); *H04W 52/0267* (2013.01); *H04W 24/08* (2013.01)

(56) References Cited

U.S. PATENT DOCUMENTS

| | | | | |
|---|---|---|---|---|
| 8,279,074 | B2 * | 10/2012 | Fischer | H01M 10/44 340/636.1 |
| 8,306,764 | B2 * | 11/2012 | Bacon | G01R 31/386 702/63 |
| 8,849,331 | B2 * | 9/2014 | Liu | H04W 52/0235 455/509 |
| 8,856,748 | B1 * | 10/2014 | Larsen | G06F 11/3668 717/125 |
| 9,285,857 | B2 * | 3/2016 | Mahajan | G01R 31/382 |
| 9,846,638 | B2 * | 12/2017 | Koneru | G06F 11/3688 |
| 10,146,658 | B2 * | 12/2018 | McPherson | G06F 11/24 |
| 2003/0156549 | A1 * | 8/2003 | Binder | H04L 43/50 370/252 |
| 2004/0168111 | A1 * | 8/2004 | Arnold | G06F 11/3664 714/57 |
| 2004/0266423 | A1 * | 12/2004 | Morikawa | H04W 24/00 455/424 |
| 2005/0008069 | A1 * | 1/2005 | Cao | G06F 1/28 375/224 |
| 2005/0188262 | A1 * | 8/2005 | Rosenman | G06F 11/2294 714/25 |
| 2006/0058994 | A1 * | 3/2006 | Ravi, Sr. | G06F 17/5022 703/23 |
| 2006/0271327 | A1 * | 11/2006 | Haggerty | G06F 11/3696 702/121 |
| 2007/0037570 | A1 * | 2/2007 | Donovan | H04W 24/00 455/423 |
| 2007/0184827 | A1 * | 8/2007 | Jin | H04M 1/24 455/423 |
| 2008/0127001 | A1 * | 5/2008 | Tamaki | G06F 17/5036 716/108 |
| 2008/0172398 | A1 * | 7/2008 | Borkenhagen | G06F 9/5044 |
| 2009/0111459 | A1 * | 4/2009 | Topaltzas | H04W 24/00 455/423 |
| 2009/0124250 | A1 * | 5/2009 | Topaltzas | H04W 24/06 455/423 |
| 2009/0249093 | A1 * | 10/2009 | Borkenhagen | G06F 1/3203 713/320 |
| 2010/0115437 | A1 * | 5/2010 | Engel | H04L 67/36 715/764 |
| 2010/0233989 | A1 | 9/2010 | Constien et al. | |
| 2010/0279681 | A1 * | 11/2010 | Ahmad | H04W 24/08 455/424 |
| 2011/0029799 | A1 * | 2/2011 | Walrath | G06F 1/26 713/340 |
| 2011/0145611 | A1 | 6/2011 | Lee | |
| 2011/0273304 | A1 * | 11/2011 | Pryor | H04Q 9/00 340/870.01 |
| 2012/0040645 | A1 * | 2/2012 | Topaltzas | H04W 24/06 455/412.1 |
| 2012/0047379 | A1 * | 2/2012 | Chen | G06F 1/3212 713/320 |
| 2013/0194289 | A1 * | 8/2013 | Snow | G09G 5/14 345/581 |
| 2013/0246827 | A1 | 9/2013 | Van Essen et al. | |
| 2013/0267179 | A1 * | 10/2013 | Parekh | H04L 41/22 455/67.11 |
| 2013/0273853 | A1 * | 10/2013 | Reed | H04W 24/08 455/67.11 |
| 2014/0004852 | A1 * | 1/2014 | Lehmann | H04W 24/08 455/425 |
| 2014/0092807 | A1 * | 4/2014 | Zhao | H04W 56/00 370/328 |
| 2014/0188412 | A1 * | 7/2014 | Mahajan | G06F 1/3206 702/63 |
| 2014/0282425 | A1 * | 9/2014 | Zhao | G06F 11/3466 717/127 |
| 2014/0320391 | A1 * | 10/2014 | Bazaz | H04W 52/0277 345/156 |
| 2014/0362713 | A1 * | 12/2014 | Agarwal | H04W 24/08 370/252 |
| 2015/0023188 | A1 * | 1/2015 | Das | G01R 31/319 370/252 |
| 2015/0082282 | A1 * | 3/2015 | Larsen | H04L 67/10 717/125 |
| 2015/0156307 | A1 * | 6/2015 | Kim | H04W 52/0261 455/566 |
| 2015/0220127 | A1 * | 8/2015 | Kukoyi | H04W 52/0258 713/340 |
| 2016/0007296 | A1 | 1/2016 | Khawand et al. | |
| 2016/0044520 | A1 * | 2/2016 | Iyer | H04W 24/08 370/252 |
| 2016/0141893 | A1 * | 5/2016 | Lee | H02J 7/007 320/107 |
| 2016/0162006 | A1 * | 6/2016 | Woo | G06F 1/3212 713/320 |
| 2016/0191696 | A1 * | 6/2016 | Kozaczuk | G06F 3/041 455/405 |
| 2016/0246352 | A1 * | 8/2016 | Elias | G06F 1/3234 |
| 2016/0282395 | A1 * | 9/2016 | Ouderkirk | G01R 1/0416 |
| 2016/0313725 | A1 * | 10/2016 | Yan | G05B 19/4148 |
| 2017/0017295 | A1 | 1/2017 | McPherson et al. | |
| 2017/0262130 | A1 * | 9/2017 | Lloyd | G06F 11/3688 |
| 2017/0279945 | A1 * | 9/2017 | Parsons | A47B 88/407 |
| 2018/0089068 | A1 * | 3/2018 | Bhojan | G06F 8/61 |
| 2018/0206136 | A1 * | 7/2018 | Chow | H04L 43/50 |
| 2018/0287926 | A1 * | 10/2018 | Williams | H04L 41/082 |
| 2018/0368072 | A1 * | 12/2018 | Myron | H04W 52/0264 |

OTHER PUBLICATIONS

Carroll et al., "An Analysis of Power Consumption in a Snnartphone" University of New South Wales, Sep. 2015 (Year: 2015).*
The PCT Search Report and Written Opinion dated Sep. 28, 2018, for PCT Application No. PCT/US18/36917, 14 pages.

* cited by examiner

SYSTEMS AND METHODS FOR TESTING POWER CONSUMPTION OF ELECTRONIC DEVICES

BACKGROUND

Due to their portable nature, battery life for portable electronic devices, such as cell phones, tablet computers, and laptops (collectively, user equipment, or UE), has always been an important metric. Increased battery life can be achieved in a number of ways. The batteries can be increased in size, but this can increase the size of the portable electronic device, which is often undesirable. The batteries can be manufactured from materials capable of holding charge more efficiently—i.e., materials with higher "charge density." The processors, memory, screens, and other components of the UE can be made more energy efficient. The applications ("apps") and other processes on the UE can also be made more efficient.

Due to the number of interactions between various components on a UE, however, it can be difficult to determine whether a new version of an app or an operating system (OS), for example, uses more or less energy. This may be because multiple components (e.g., the processor, memory, and transceiver) are invoked by the app, because the app uses, or liaises, with other apps, or even because the location of the UE has changed from one test to the other. UEs that are farther away from a cell tower, for example, may broadcast at a higher power level than UEs that are closer to a cell tower.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Examples of the present disclosure relate to systems and methods for measuring individual power consumption for multiple user equipment (UEs) in a test environment. The system can include a bank, or "farm," of user equipment (UE), such as, for example, a plurality of cellular phones, tablet computers, or laptops. The system can also include a plurality of power monitors, a microcontroller, a user interface (UI), and one or more computers or servers. The system can run simulations on multiple UEs simultaneously, or in a sequential or cascaded manner, to establish baseline power consumption rates and then to test changes in consumption due to various applications ("apps"), tasks, updates, or other activities.

To simplify and clarify explanation, the system is shown and described below for use with a cellular smart phone. One of skill in the art will recognize, however, that the system could also be used for any type of electronic device. Indeed, the systems and methods described herein can be used in conjunction with any device that includes software and hardware components on which one might want to measure and/or optimize power consumption.

Battery life, and thus, power consumption, are major factors in the success of many mobile devices. Manufacturers and cellular providers tout the talk and standby times of new models, for example, in marketing campaigns. Laptop manufacturers advertise battery life as a major selling point. Processor power and memory capacity are also important, however; which generally places increased demands on batteries (e.g., increased processing power generally causes increased power consumption). To this end, a larger battery will have more power capacity than a smaller battery, but manufacturers must be careful to maintain a convenient package. A smart phone, for example, is often carried in a user's pocket or purse, where small and slim design is advantageous.

Conventionally, measurement of power consumption for a UE has generally been done at the app or component level—as opposed to the device level. The power consumption from a particular app, for example, can be measured using various methods. A system-on-chip power monitor, for example, can measure a portion of the current used by the UE, but tends to monitor only a portion of the total power consumption and can also be too inaccurate for useful comparison. In addition, measuring the current used by a particular app does not measure increases in power consumption from auxiliary apps and tasks. In other words, opening a particular app may cause other, associated, apps to open and may use additional components (e.g., transceivers, processors, memory, etc.) to complete a particular task. Thus, simply measuring the power consumption of a single app or component fails to measure any incidental power consumption caused by the app.

There is also currently no standard in place regarding the power consumption of UEs. Thus, manufacturers and developers are free to make applications, operating systems (OS), and UEs with little regard for power consumption other than the aforementioned market forces. One has only to look at the progression of OSs over time to see the increase in processor power, memory, and other resources required to run these bloated programs. All of this results in increased power consumption.

It would be useful, therefore, to be able to measure the power consumption of multiple UEs simultaneously at the device level—as opposed to at the app level. It would also be useful to automate some, or all, or the testing process to normalize results between multiple UEs, multiple locations, and other factors. It would also be useful to provide a standard, similar to, for example, Energy Star® for appliances, for power consumption for electronic devices by which UE, apps, updates, and other components can be measured. Only new versions that decrease power consumption over old versions, for example, would receive the energy certification. It is to such systems and methods that examples of the present disclosure are primarily directed.

Figure 1:
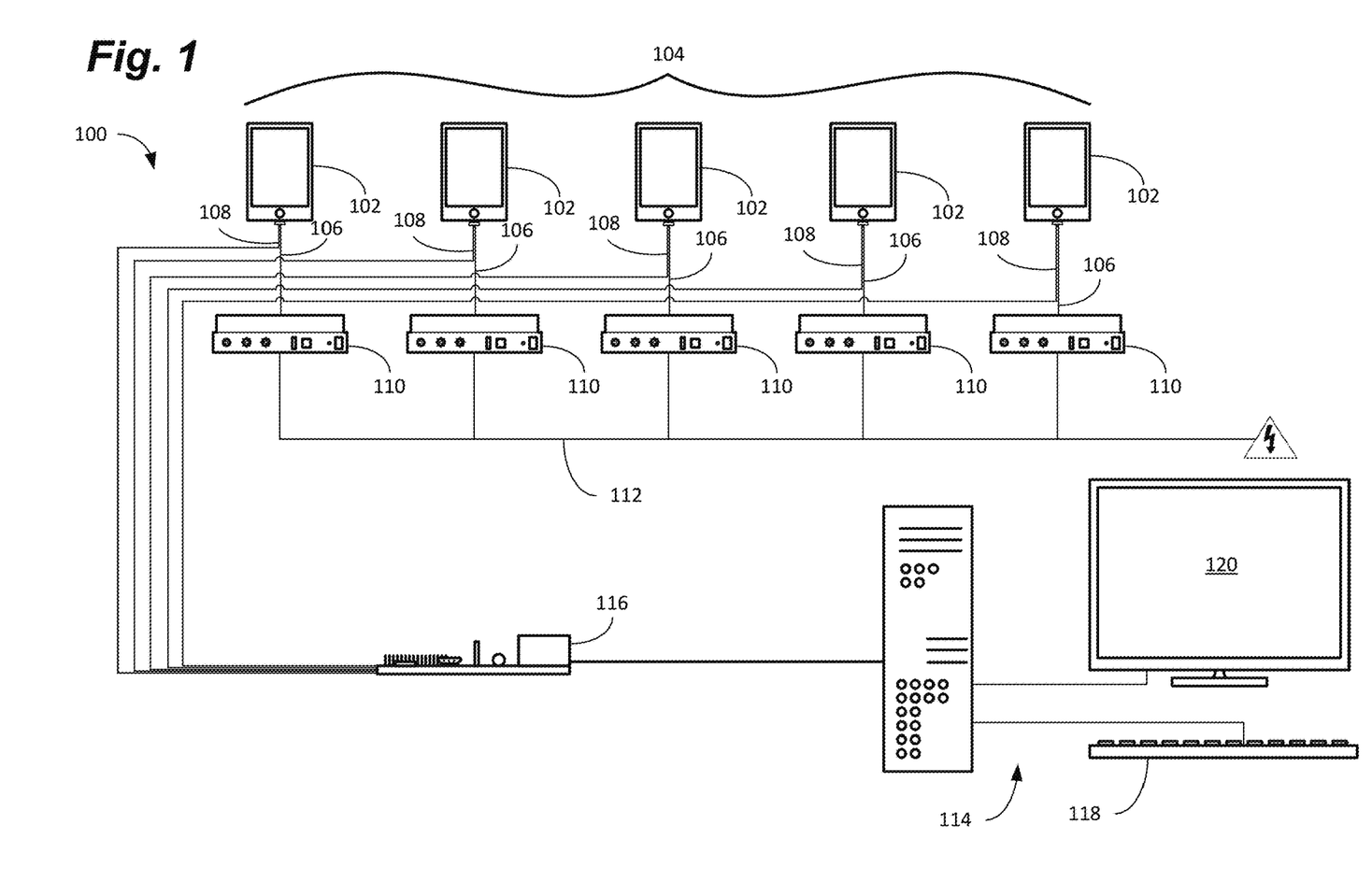
FIG. 1 depicts an example of a system to measure power consumption on multiple user equipment (UEs) simultaneously, in accordance with some examples of the present disclosure.

Examples of the present disclosure can comprise a system 100 for measuring the power consumption of multiple UE 102 in a UE farm 104. As shown, the system 100 can comprise a plurality of UE 102. In this case, the UE 102 are depicted as smart phones; however, as mentioned above, the UE 102 could also comprise tablet computers, laptops, medical devices, game consoles, or any other electronic device.

As shown, the system 100 can include at least two basic connections for each UE 102—a power line 106 and a communications line 108. The power line 106 can connect each UE 102 to a power monitor 110. The power monitor 110, in turn, can be connected to mains power 112, a battery, a voltage regulator, or other suitable power source. The power monitor 110 can include a hardware component and a software component (a graphical user interface, or GUI), which can be run from a workstation 114. The system 100 can also include a microcontroller 116 such as, for example, a Raspberry Pi, Arduino, laptop, dedicated cell phone, internet connected server, or other controller connected to the workstation 114 and to each UE 102 via a communication line 108.

As shown, each UE 102 can be connected to a power monitor 110. The power monitor 110 can provide information to the system 100 regarding the overall power consumption of each UE 102 by measuring current, battery level (in mAh or percentage), battery voltage, wattage, etc. The power monitor 110 can be connected directly to the UE 102 using main connections 110a, for example, or can be connected using a universal serial bus (USB) connection 110b, or other suitable means. Thus, the power monitors 110 can simultaneously provide power to the UEs 102 and measure the power consumed by the UEs 102.

The workstation 114 can also comprise one or more input devices (e.g., a mouse and a keyboard 118) and a monitor 120. In some examples, as discussed below with reference to FIG. 2, the monitor 120 can be a touchscreen to enable the monitor 120 to run a touch-based graphical user interface (GUI) 200 similar to the standard GUI on the UE's 102. In this manner, when a user performs an action (e.g., sending a text message or e-mail) on the monitor 120, the action can be replicated on all of the UEs 102—with or without a delay. In other examples, the user can simply select functions using a mouse, keyboard, or other input devices.

The power monitor 110 can also include a software component, which can run on the workstation 114, or can communicate with the workstation. The data from the power monitors 110 can enable the workstation 114 to provide graphs and tables of power consumption over time, maximum power consumption, changes in power consumption, etc. This can enable the system 100 to directly track overall power consumption for each UE 102 as the result of various activities on the UE 102 (sending text messages, sending e-mails, using new apps, etc.). Thus, as discussed below, the power monitor 110 (or monitoring software on the workstation 114 with input from the power monitors 110) can enable users to perform various activities, or tasks, and then review changes in power consumption on the UE 102 as the result of performing the tasks.

The system 100 can also include the microcontroller 116, which can be in communication with the workstation 114 and each UE 102. It should be noted that, while a single microcontroller 116 is shown, other configurations are contemplated. In other words, there could be one microcontroller 116 for each UE 102, one microcontroller 116 to many UEs 102 (shown), or multiple microcontrollers 116 to multiple UEs 102 (but not necessarily one-to-one) utilizing an intelligent queueing algorithm. As discussed below with reference to FIG. 2, the workstation 114 can include a UI 200 for automatically controlling the UEs 102 from the workstation 114 via the microcontroller 116. In other words, any input by a user on the workstation 114 can be replicated on each UE 102—as if the user had entered it directly on the UE 102. If a user sends a test text message from the workstation 114, for example, each UE 102 can be commanded to send the text message as if the text message had been typed and sent directly from the UE 102.

In some examples, as discussed below, the workstation 114 or the microcontroller 116 can include a delay to "cascade" the text message on each UE 102 to avoid testing errors caused by multiple UEs 102 sending a text message at the same time. In other examples, all UEs 102 may be commanded to send the text message at the same time, for example, to monitor any changes in power consumption caused by conflicts and/or queuing in the communications network. The workstation 114 and microcontroller 116 can also be used to automate tasks such as, for example, sending a test e-mail repeatedly, opening and closing an app repeatedly, performing a sequence of different tasks, or performing certain tasks at predetermined intervals.

Figure 2:
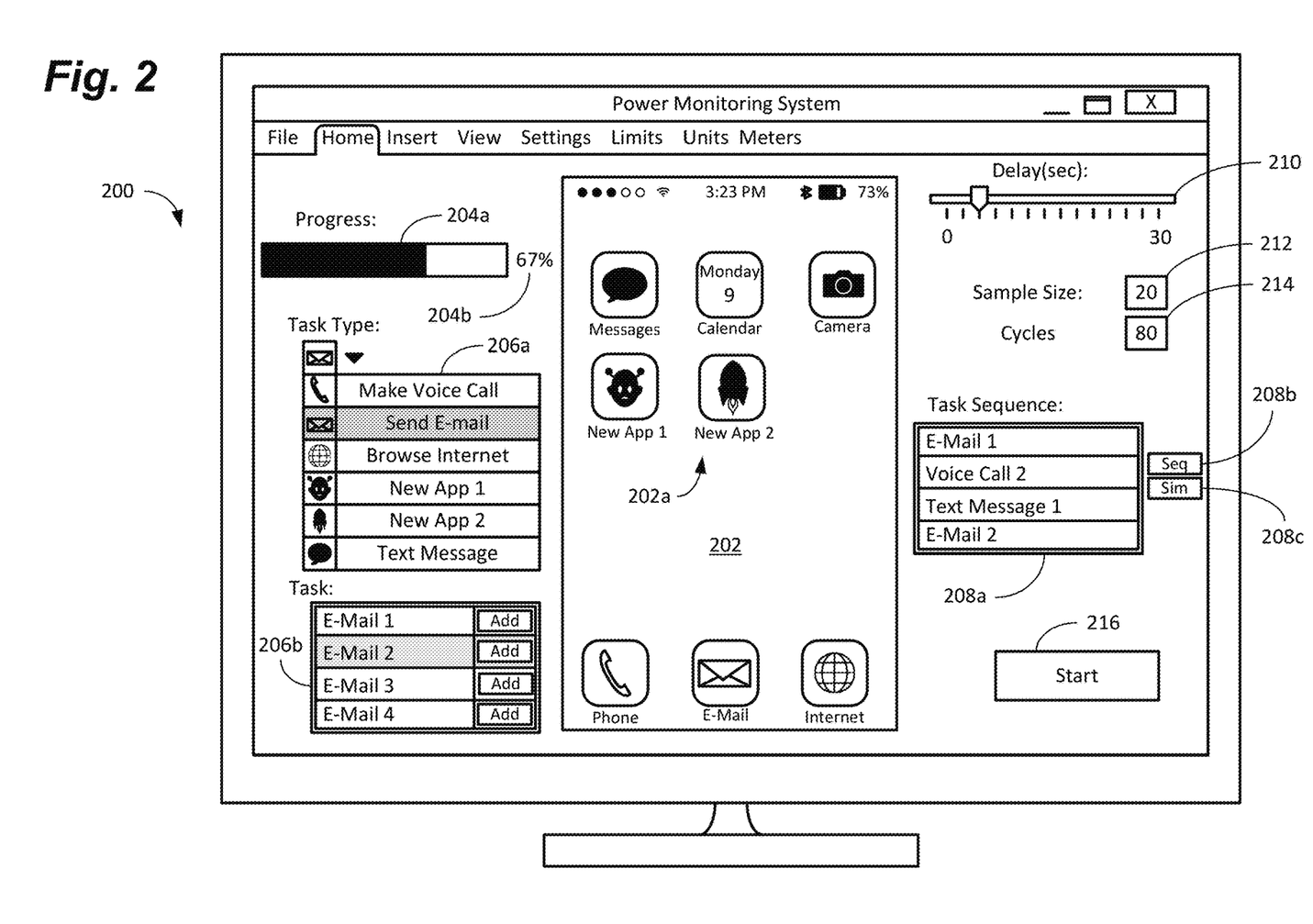
FIG. 2 depicts an example of a first graphical user interface (GUI) to operate the system of FIG. 1, in accordance with some examples of the present disclosure.

As shown in FIG. 2, the system 100 can also include a user interface (UI) 200 running on the workstation 114 or a dedicated device (e.g., computer, tablet, etc.) and displayed on the monitor 120. In some examples, the UI 200 can comprise one or more inputs and a generic UE GUI 202 designed to activate certain functions on the UEs 102. In other examples, the UE GUI 202 portion can look the same, and emulate, the standard GUI on the UEs 102. If the UEs 102 are Android® devices, for example, the UE GUI 202 can be the same, or substantially similar, to a standard Android® GUI. If, on the other hand, the UEs 102 are iOS devices, the UE GUI 202 can be substantially similar to the iOS GUI (shown). To this end, the UE GUI 202 can comprise one or more icons 202a for activating various apps or performing various tasks. In some cases, the monitor 120 can be touchscreen monitor, for example, and the UE GUI 202 can enable the user to access functions on the UEs 102 by touching the icons 202a, entering data, and taking other actions—as if the user was using the UEs 102 directly. In other examples, the user can simply enter commands and/or make selections using a mouse, keyboard, voice commands, or other input.

The UI 200 can also comprise a plurality of test inputs. The UI 200 can include, for example, a progress meter 204, task type selector 206a, a task list 206b, a task sequence list 208a, one or more controls 208b, 208c, a delay input 210, a sample input 212, a cycle input 214, and a start button 216. When performing multiple tasks, the progress meter 204 can indicate how far along the system 100 is in performing the overall task. So, for example, the user may wish to send 100 e-mails from each UE 102 to monitor power consumption over time. Upon hitting the start button 216 (or the send button in the e-mail app on the UE GUI 202), therefore, the progress meter 204 can begin moving from left to right, as shown, to indicate how the process of sending 100 e-mails is progressing. In some examples, the progress meter 204 may include a graphical meter 204a and a numerical meter 204b (e.g., showing a percentage of completion).

In some examples, the UI 200 can also include a task type selector 206a. As shown, the task type selector 206a can enable the user to select a particular task for the UE farm 104 to perform. The task type selector 206a can enable the user to send e-mails, text messages, browse the Internet, or open and/or use one or more new apps (e.g., New App 1 and New App 2). In some examples, the UE farm 104 can be running a standard set of programs—e.g., an "out of the box" configuration—and then the user can use the task type selector 206a to run a particular app to monitor the change in power consumption on the UEs 102 due to activating the app.

The UI 200 can also include a task list 206b. The task list 206b can change in response to the user's selection of a particular task in the task type selector 206a. As shown, the user has selected "Send E-Mail" in the task type selector 206a. As a result, the task list 206b can include a plurality of "canned" e-mails that can be chosen. Of course, the task list 206b may also include a "custom" selection to enable the user to enter a new e-mail for testing. In some examples, the canned e-mails can be a specific length or contain specific characters, for example, to enable the system 100 to test power consumption caused by specific e-mails or messages. In addition, sending the same e-mail from multiple UEs 102 can provide comparative power consumption, which can be used, for example, to identify anomalies in the UE farm 104—e.g., UEs 102 with abnormal power consumption.

In other examples, the user may select "Send Text Message" in the task type selector 206a. In this case, the task list 206b can contain a plurality of canned text messages. The task list 206b can include, for example, text messages that include only text, text messages that include only emojis, and text messages that contain both text and emojis. In this manner, any power consumption differences between the two types of messages can be identified.

In still another example, the user may select "New App 1" or "New App 2" in the task type selector 206a. In this case, the task list 206b may include one or more routines to run in the applications. If New App 1 is a game, for example, the task list 206b can include "run in demo mode," for example, or other specific tasks. If New App 2 is navigation software, on the other hand, the task list 206b can include navigating to a specific location or along a particular route. Thus, the power consumption in the UEs 102 caused by the navigation program and/or location services (e.g., a global positioning system (GPS) receiver and/or cellular location systems) can be measured. In this manner, the power consumption caused by the program itself, the GPS receiver, and any background programs, for example, can be measured and compared to the out-of-the-box baseline.

Similarly, if the user selects "Browse Internet" in the task type selector 206a, the task list 206b may include a plurality of bookmarks for specific websites, for example, or various web-based activities (e.g., send an e-mail via an HTTP web service). If the user selects "Make Voice Call" in the task selector, the task list 206b can include specific test numbers to call or sequences of test numbers, for example, to test the power consumption of the connecting, voice transmission, and disconnecting processes, among other things. The task list 206b may include calls to different types of numbers (e.g., local, long-distance, overseas, etc.) to locate differences in energy consumption between call types, if any. The task list 206b may also include pre-recorded messages to be used on simulated voice calls to measure the power consumption of transmitting actual voice data.

The UI 200 can also include a task sequence list 208a. In this manner, the user can select a plurality of tasks, using the task type selector 206a and task list 206b to be performed simultaneously or sequentially by the UE farm 104. To this end, in some examples, the UI 200 can also include two or more buttons to enable the user to choose a simultaneous execution control 208b (e.g., a button), for example, a sequential execution control 208c, or combinations thereof. Simultaneous execution—the UEs performing all of the tasks in the task sequence list 208a at the same time—can test the power consumption ramifications of heavily loading the processor, transceiver, and other components of the UEs 102, among other things. UEs 102 with multi-core processors and/or threading, for example, may be better suited to simultaneous execution than other configurations. Sequential execution, on the other hand, can be used to test, for example, the power consumption ramifications of opening and closing apps, allotting and releasing memory, taking discrete actions, etc.

The UI 200 can also include a delay input 210. In some examples, it may be desirable to change the delay between sending a text message, for example, on a first UE 102(1) and sending the same message on a second UE 102(2). This can enable the system 100 to eliminate differences in power consumption between UEs 102 in the UE farm 104 based solely on traffic. In other words, if all of the UEs 102 in the UE farm 104 are set to send a text message at the same time, then some differences in power consumption may be measured based solely on the queue caused by the system 100 sending more text messages than can be handled immediately by the local cell tower. Thus, UEs 102 may be forced to send the message multiple times, or send a request, wait for a response, then send the text message, etc. Thus, introducing a delay can enable each UE 102 to be measured sending the text messages one at a time.

The delay can be set by the user using the delay input 210 to any suitable value that avoids this queueing effect. For text messages, the delay may only need to be milliseconds (e.g., the time required to send a text message). For the apps (e.g., New App 1 and New App 2), which may have high bandwidth requirements, on the other hand, the delay may be several seconds or minutes to enable each UE to run through a routine separately. In some examples, rather than the user manually setting the delay, the delay can be included when the user selects the task from the task list 206b.

If a user sets the delay input 210 to zero on the other hand, all UEs 102 in the UE farm 104 can execute (or attempt to execute) the task(s) at the same time. This can enable the system 100 to measure power variations due to the queuing effects discussed above. Improved queue handling in a newer version of an OS, for example, may reduce the power consumption of the UEs 102 in high-traffic situations.

The UI 200 can also include a sample input 212 and a cycle input 214. The sample input 212 can enable the user to choose the number of UEs 102 (e.g., 20, as shown) in the UE farm 104 the user wishes to use in a particular test. In some examples, the user may wish to use all the UEs 102 in the UE farm 104 at the same time. In other examples, the user may wish to select a particular task for some of the UEs 102 and a different task for other UEs 102 in the UE farm 104. This can enable conflicts and interactions between the UEs 102—and the resulting changes in power consumption—to be measured, among other things. In still other examples, the user may wish to use only a few UEs 102 to establish a baseline or perform simple tests that do not require the entire UE farm 104.

Similarly, the cycle input 214 can enable the user to enter the number of times each selected UE 102 should perform the selected task. So, for example, the user may choose 20 UEs 102 (using the sample input 212) to send 80 text messages each (as shown)—or, 1600 text messages all together. Thus, if the user wishes to measure the power consumption of sending multiple text messages over time, the user can choose a relatively high number for the cycle input 214 to cause each UE 102 to send text messages for a predetermined amount of time. Again, the user may choose to introduce a delay using the delay input 210 to prevent excessive interference between the UEs 102.

Finally, the UI 200 can include a start button 216 to begin the test at the user's command. In some examples, upon activation, the start button 216 may convert to a stop button to enable the user to stop a test prior to completion. This may be useful when a trend has already become apparent and further testing is not needed, for example, or an error has occurred with one or more of the UEs 102 or the system 100. In some examples, as discussed below, the initiation of a task may be caused by the user's selections (e.g., hitting send) on the UE GUI 202.

As mentioned above, in some examples, the UI 200 can include a standard UE GUI 202 that emulates the GUI for the particular type of UE 102 (e.g., Windows®, iOS®, Android®, etc.) under test. Thus, a user can enter inputs on the touchscreen monitor 120, for example, and the UEs 102 can react as if the user was using the UEs 102 directly. Because of the interface provided by the microcontroller 116, each UE 102 executes the command from the UE GUI 202 on the workstation 114 as if the command had been entered directly on the UE 102. In this manner, tens, hundreds, or thousands of UEs 102 can be tested simultaneously and automatically. Indeed, after the user provides any inputs needed on the UI 200 the testing and measurement process can be completely automatic.

In some examples, rather than using the task type selector 206*a* and the start button 216, the user can set the delay input 210, sample input 212, and/or cycle input 214, as desired, and then merely perform the desired task on the UE GUI 202. In other words, the UI 200 can be used merely to set the number of iterations, delay, etc., and then the user performing the task on the UE GUI 202 can start the process. Thus, the user hitting "send" for a text message or voice call, for example, can start the process automatically regardless of how many samples or cycles are requested. Thus, each UE 102 responds (due to the microcontroller 116) as if the user were entering the commands directly on each UE 102 providing an accurate simulation.

Thereafter, the workstation 114 can continue to send the commands until the necessary number of samples and/or cycles have been performed. In other words, typically, UEs 102 do not include software for testing purposes (e.g., repeatedly sending the same text message 20 times). In addition, even if such an app existed and were installed, the user would nonetheless have to start the process individually on each UE 102 in the UE farm 104. Thus, the system 100 substantially reduces the labor and time required for testing by enabling the user to control the UE farm 104 via the UI 200.

In some examples, rather than using the above-mentioned UI 200, the system 100 can use a similarly configured application programming interface (API). In other words, rather than manually entering the settings on the UI 200, as discussed above, the user could also write a program/application/script using the API to run tests automatically and provide reports and logs. As above, the script can include the number of UEs to include in the test, the number of cycles, what tasks or sequence of tasks to perform, etc. In this configuration, the program could be set to run continuously, to run at a certain time of day every day, or at another interval and then provide reporting and/or logs after each set of tests, each day, weekly, etc.

The program can be run on the workstation 114, for example, to enable testing to be made substantially automated. Once initiated, the API can conduct testing automatically until interrupted by the user. Log files, reports, and other results from testing could be periodically saved on the workstation, printed, or otherwise recorded. This can reduce the cost of testing by reducing labor costs, among other things.

Figure 3:
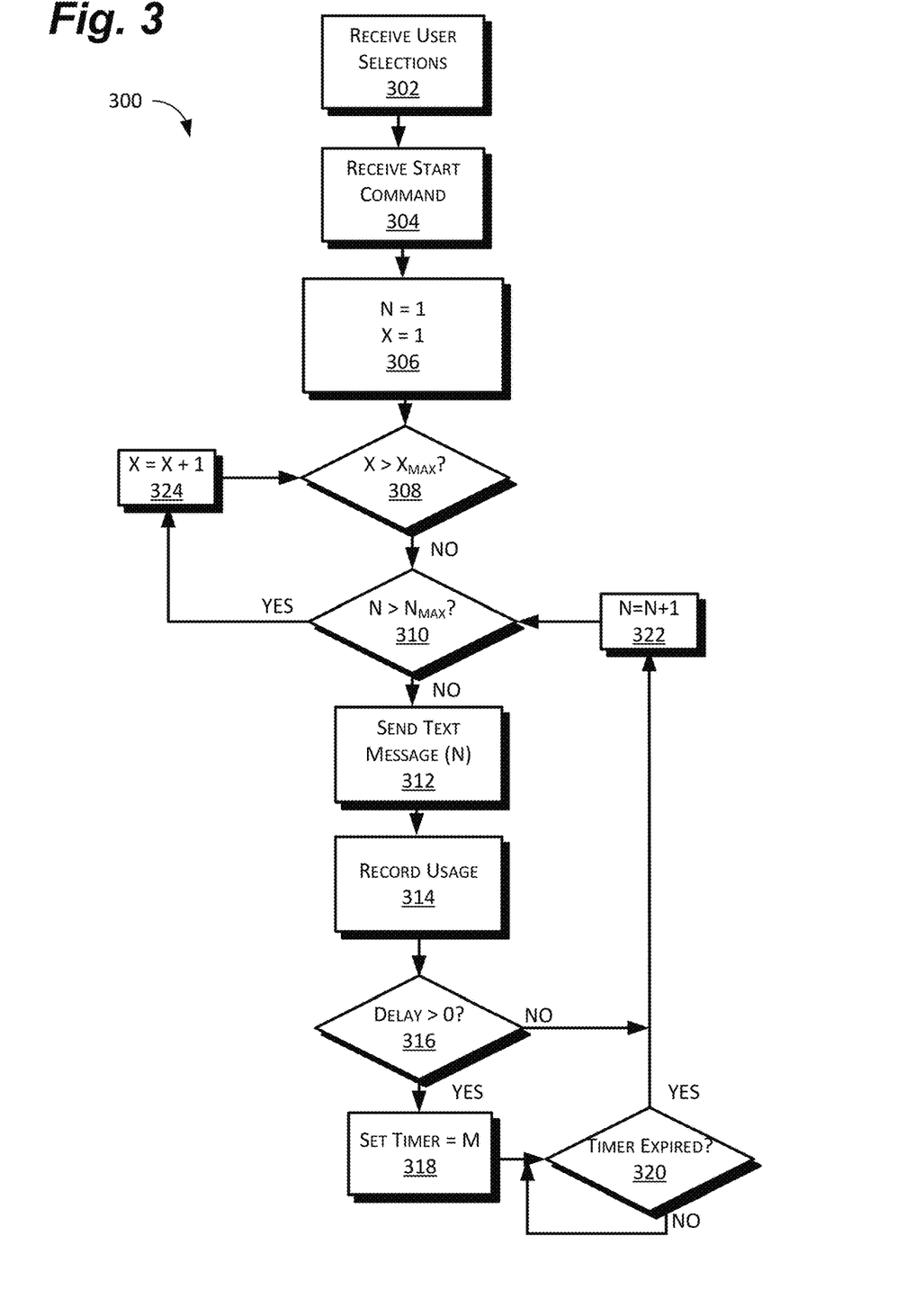
FIG. 3 depicts an example of a method to measure power consumption on multiple user equipment (UEs) simultaneously, in accordance with some examples of the present disclosure.

Examples of the present disclosure can also comprise a method 300 of using the system 100 and UI 200 above to test a plurality of UEs 102. As mentioned above, the system 100 can be used to monitor power consumption for the UE farm 104 as they perform various tasks. Unlike previous systems, however, the power monitors 110 enable the system 100 to monitor total UE 102 power consumption for each UE 102, rather than just portions or changes in power consumption. In addition, the system 100 can enable the UE farm 104 to be cycled through multiple tasks automatically, substantially reducing the labor and expense required to test the UEs 102.

At 302, the method 300—e.g., the workstation 114 via the UI 200—can receive one or more user inputs about a test to be performed. As mentioned above, the user may use the UI 200 to set how many UEs 102 to include in the test ($N_{MAX}$), how many cycles to perform ($X_{MAX}$), and to add in any delay, among other things. The UI 200 can also enable the user to choose one or more tasks to perform in the task type selector 206*a* or on the UE GUI 202. FIG. 3 depicts sending a text message, for example, but other tasks, or combinations of tasks, could be used as well.

At 304, the method 300 can receive a signal to start the testing process. As mentioned above, this signal can comprise the user hitting the start button 216 on the UI 200. The signal could also comprise the selection of a send button, or other input, from the UE GUI 202. So, for example, in this case, the user can type an e-mail on the UE GUI 202 and then hit send. The system 100 can then start the testing process.

In some examples, the method 300 can be triggered automatically by an automated scheduling software via an application programming interface (API). The API can enable automatically starting a test at a certain time every day (e.g., during peak traffic to test network traffic handling), for example, or to run a test every hour (e.g., to compare peak and off-peak performance). Thus, once initiated, the method 300 may continue automatically until, for example, a certain number of tests have been run, a certain number of days have passed, or until a user manually stops the process.

At 306, the method 300 can set two counters—one for the number of UEs 102 (N), or the sample size, and one for the number of cycles (X), or iterations. At 308, the method 300 can determine if the requested number or cycles, X, has been completed ($X > X_{MAX}$). If so, the method 300 can stop and await further input from the user.

At 310, if the requested number of cycles has not been completed ($X \leq X_{MAX}$), the method can then determine if the requested number of UEs 102 have repeated the task the requested number of time ($N \leq N_{MAX}$). In this case, this determination is whether all of the UEs 102 have sent the text message. Of course, the task could be other tasks such as, for example, sending an e-mail, placing a voice call, etc.

At 312, if all of the UEs 102 have not sent the first text message, the method can continue by sending a signal to the appropriate UE, UE(1) to send the text message. This can be a signal sent from the UI 200 to the microcontroller 116 and then to UE(1). Because of the interface between the microcontroller 116 and UE(1), however, UE(1) perceives the signals as if the user were simply typing and sending the text message directly from UE(1).

At 314, the method 300 can record the usage of UE(1) while sending the first text message as provided by the power monitor for UE(1). This can include recording any change in power consumption while the text message is being "typed" (sent from the microcontroller 116), saved, when the screen on the UE is updated as the message is typed, and sent via UE(1), among other things. In other words, in some examples, the microcontroller 116 can include a script to simulate a user actually typing the text message into UE(1). In other examples, the microcontroller 116 can simply send the text message as a packet, for example, and the command to send the text message. In still other examples, each UE 102 can have one or more test text messages stored in onboard memory, and the signal can simply comprise a command to "Send Test Message 1."

Text messaging may invoke the OS on UE(1), a text messaging app, and the transceiver, among other things. Using the power monitors 110 to measure overall power consumption, rather than other metrics, however, can capture the overall effect of a particular task. Indeed, many applications (e.g., social media sites) involve multiple components on the UE 102 (processor, memory, GPS, imaging, video playback, sound playback, etc.) and multiple applications (video players, location services, instant messaging, etc.) on the UE 102 at the same time. Thus, simply measuring the power consumed by the application may not be an accurate metric representative of the actual customer/user experience. As discussed below with reference to FIG. 4, power consumption statistics can be presented in many forms.

At 316, the method 300 can determine whether any delay has been requested between text messages. As mentioned above, this may enable conflicts caused by multiple UEs 102 attempting to perform the same task at the same time. The delay may be set by the user or may be set automatically based on the selected task. In other words, the delay between text messages may be shorter than the delay for voice calls, for example, simply because voice calls take longer to connect.

At 318, if a delay was requested, the method 300 can set the timer value, M, to the value provided by the user or the system 100. At 320, the method 300 can determine if the timer has expired. If the timer has not expired, the method 300 can recheck until it does. At 322, if the timer has expired, on the other hand, N can be increased by one to move to the next UE 102, UE(2), for example, to send the first text message.

At 310, this process can continue until the all of the UEs 102, i.e., UE(1)-UE(N), in the sample have sent the first text message (N>$N_{MAX}$). At 324, when all of the UEs 102 have sent the first text message, X can be increases by one to begin the second iteration, if applicable. This process can continue until all of the UEs 102 in the sample, N, have sent the text message the requested number of times, X. If the user sets N to 20 and X to 20, then 20 UEs 102 will have sent 20 text messages, or a total of 400 messages.

Returning to step 316, if there is no delay selected by the user, this can indicate at least two possible courses of action. The first possibility is that the system 100 send the command to all UEs 102 in the sample, N, at the same time as a batch. In this configuration, the microcontroller 116 may have multiple outputs, one for each UE 102, to enable the command to be sent from the microcontroller 116 to all of the UEs 102 at the same time.

The second possibility is that the system sends the command to the UEs 102 as fast as possible, but in a serial fashion. In other words, if one or both of the communications lines 108 or the interface on the microcontroller 116 is serial in nature, the system 100 can send the commands to each UE 102 one at a time. Thus, while this may happen in a matter of milliseconds, there may be some small delay between each command just due to the serial nature of the communications.

In either configuration, multiple UEs 102 can be commanded to send a text message at the same time, or at substantially the same time. This may be useful to test the effects of conflicts and backlogs on the power consumption of the UEs 102, for example, or to test the ability of the communications network to deal with high traffic situations. Various UEs 102 and/or applications may be more efficient at handling queued communications than others, for example, which can become apparent by intentionally causing the queue in the first place.

Returning to step 324, each iteration of the test may be the same, similar, or completely different. In other words, as mentioned above, in some examples, the user may choose to send a text message, then an e-mail, then place a voice call as a series of tasks to test the UEs 102 ability to move from one application to the next, release memory, shut down applications, place components on standby, etc. Thus, in any test with more than one iteration, the second and subsequent iterations can comprise doing the same task over and over again (e.g., sending the same test text message repeatedly), doing similar tasks (e.g., sending different test text messages in each iteration), or doing completely different tasks each iteration (e.g., send a text message, then an e-mail, then place a voice call, etc.).

FIG. 3 is a flow diagram of an illustrative process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described should not be construed as a limitation, and any number of the described blocks can be combined in any order and/or in parallel to implement the processes.

Figure 4:
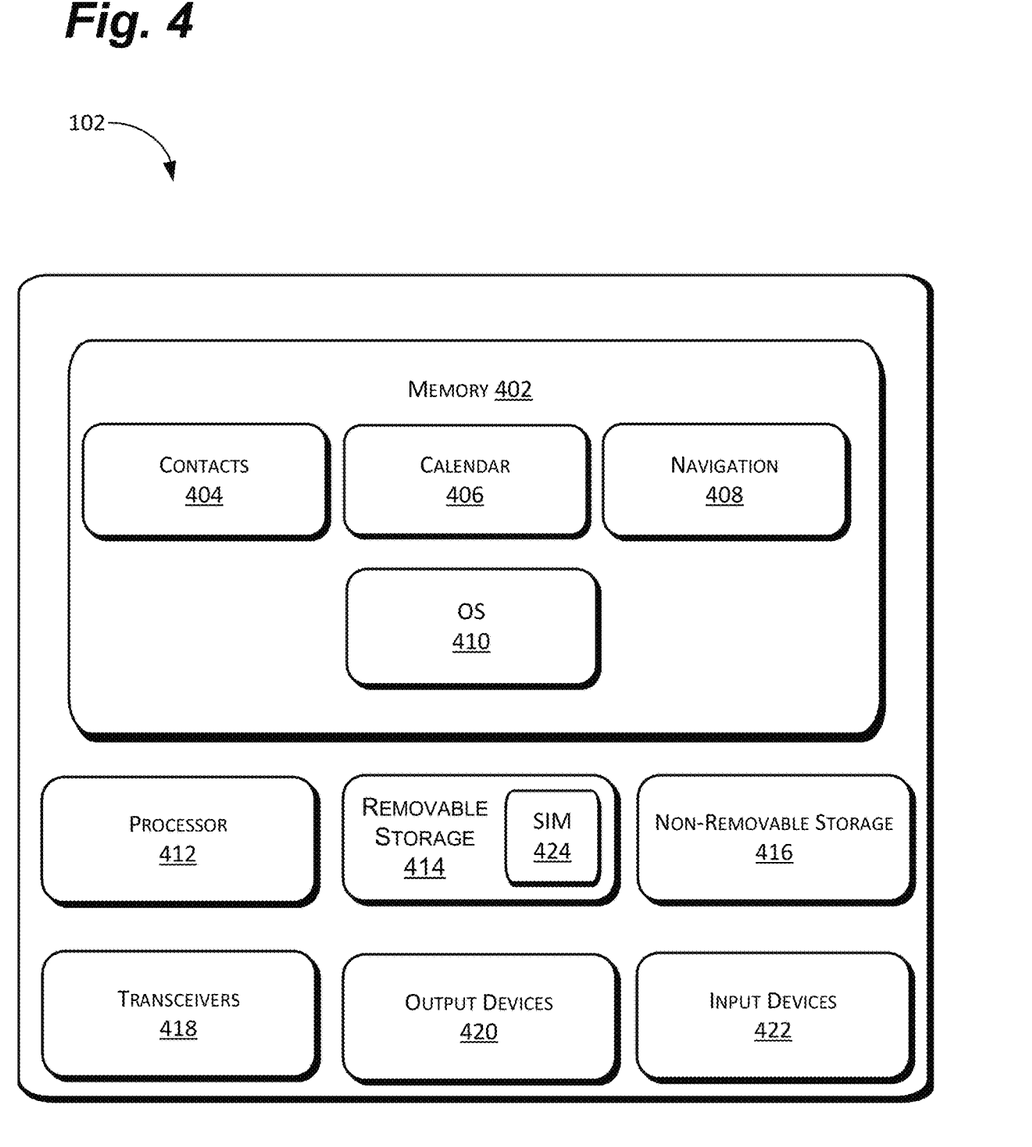
FIG. 4 depicts an example of a UE to be tested by the system of FIG. 1, in accordance with some examples of the present disclosure.

As shown in FIG. 4, the system 100 can be used to in conjunction with testing a variety of electronic devices. For clarity, the testing of cell phones is described herein. One of skill in the art will recognize, however, that the system 100 can also be used with a variety of other electronic devices, such as, for example, tablet computers, laptops, games consoles, and GPS receivers, which are referred to collectively as UEs 102. The UEs 102 can comprise a number of components to execute the above-mentioned functions and apps. As discussed below, the UEs 102 can comprise memory 402 including many common features such as, for example, the contacts 404, calendar 406, navigation software 408, and the operating system (OS) 410. Because the system 100 is configured to monitor the UEs 102 externally and includes an interface to control the UEs 102 directly, no special modifications to the UEs 102 are needed other than any settings or permissions used to permit communication between the workstation 114, microcontroller 116 and the UE 102, if any. As a result, UEs 102 can be tested by the system 100 "out-of-the-box (e.g., as they came from the manufacturer or provider), for example, and then tested with new apps, new versions of software or firmware, or other changes. As mentioned above, in many cases, it is the comparative energy consumption that is useful.

The UEs 102 can also include one or more processor(s) 412, removable storage 414, non-removable storage 416, transceiver(s) 418, output device(s) 420, and input device(s) 422. In some examples, such as for cellular communication devices, the UEs 102 can also include a subscriber identification module (SIM) 424 including an International Mobile Subscriber Identity (IMSI), and other relevant information.

In various implementations, the memory 402 can be volatile (such as random access memory (RAM)), non-volatile (such as read only memory (ROM), flash memory, etc.), or some combination of the two. The memory 402 can include all, or part, of the functions 404, 406, 408 and the OS 410 for the UEs 102, among other things.

The memory 402 can comprise contacts 404, which can include names, numbers, addresses, and other information about the user's business and personal acquaintances, among other things. In some examples, the memory 402 can also include a calendar 406, or other software, to enable the user to track appointments and calls, schedule meetings, and provide similar functions. In some examples, the memory 402 can also comprise navigation software 408 such as global positioning system (GPS) and/or cellular location based navigation systems. Of course, the memory 402 can also include other software such as, for example, e-mail, text messaging, social media, and utilities (e.g., calculators, clocks, compasses, etc.).

The memory 402 can also include the OS 410. Of course, the OS 410 varies depending on the manufacturer of the UE 102 and currently comprises iOS 10.3.2 for Apple products, for example, and Nougat for Android products. The OS 410 contains the modules and software that supports a computer's basic functions, such as scheduling tasks, executing applications, and controlling peripherals. OS 410 updates are a significant source of issues and bugs, and are sometimes rolled back or immediately replaced for this reason. Updates to the OS 410 can cause significant changes in power consumption due to conflicts, errors (e.g., infinite loops), and added features that require additional resources among other things.

The UEs 102 may also include additional data storage devices (removable and/or non-removable) such as, for example, magnetic disks, optical disks, or tape. Such additional storage is illustrated in FIG. 4 by removable storage 414 and non-removable storage 416. The removable storage 414 and non-removable storage 416 can store some, or all, of the functions 404, 406, 408, 410.

Non-transitory computer-readable media may include volatile and nonvolatile, removable and non-removable tangible, physical media implemented in technology for storage of information, such as computer readable instructions, data structures, program modules, or other data. The memory 402, removable storage 414, and non-removable storage 416 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the UEs 102. Any such non-transitory computer-readable media may be part of the UEs 102 or may be a separate database, databank, remote server, or cloud-based server.

In some implementations, the transceiver(s) 418 include any sort of transceivers known in the art. In some examples, the transceiver(s) 418 can include wireless modem(s) to facilitate wireless connectivity with the other UEs, the Internet, and/or an intranet via a cellular connection. Further, the transceiver(s) 418 may include a radio transceiver that performs the function of transmitting and receiving radio frequency communications via an antenna (e.g., Wi-Fi or Bluetooth®). In other examples, the transceiver(s) 418 may include wired communication components, such as a wired modem or Ethernet port, for communicating with the other UEs or the provider's Internet-based network.

In some implementations, the output device(s) 420 include any sort of output devices known in the art, such as a display (e.g., a liquid crystal or thin-film transistor (TFT) display), a touchscreen display, speakers, a vibrating mechanism, or a tactile feedback mechanism. In some examples, the output devices can play various sounds based on, for example, whether the UEs 102 is connected to a network, the type of call being received (e.g., video calls vs. voice calls), the number of active calls, etc. Output device(s) 420 also include ports for one or more peripheral devices, such as headphones, peripheral speakers, or a peripheral display.

In various implementations, input device(s) 422 include any sort of input devices known in the art. For example, the input device(s) 422 may include a camera, a microphone, a keyboard/keypad, or a touch-sensitive display. A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 5:
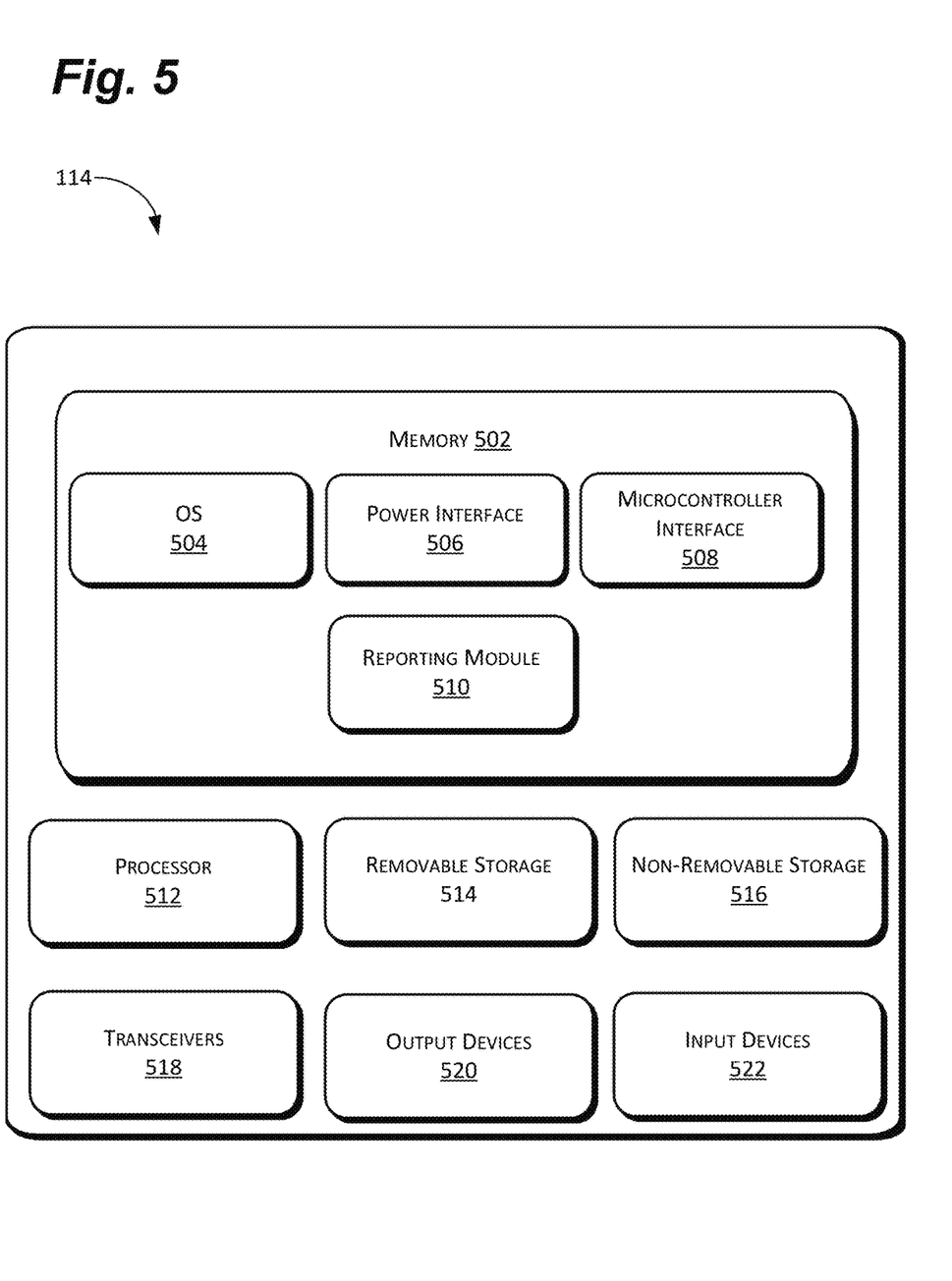
FIG. 5 depicts an example of a workstation as shown in the system of FIG. 1, in accordance with some examples of the present disclosure.

As shown in FIG. 5, the system 100, UIs 200, 600, 700 (discussed below), and methods 300 can be implemented in conjunction with a workstation 114. The workstation 114 is shown and described herein as a desktop computer. One of skill in the art will recognize, however, that a variety of electronic devices, such as cell phones, smart phones, tablet computers, and laptops could also be used. The workstation 114 can comprise a number of components to perform the above-mentioned functions. As discussed below, the workstation 114 can comprise memory 502 including many common features such as, for example, the OS 504 for operating the workstation 114. The workstation 114 can also include various modules for use with the system 100 such as, for example, a power interface 506, a microcontroller interface 508, and a reporting module 510.

The workstation 114 can also include one or more processor(s) 512, removable storage 514, non-removable storage 516, transceiver(s) 518, output device(s) 520, and input device(s) 522. In some examples, some, or all, of the functions associated with the workstation 114 and method 300 discussed herein can also be handled by a remote server or other remote network entity. As with the UE 102, the memory 502 can be volatile (such as RAM), non-volatile (such as ROM, flash memory, etc.), or some combination of the two. The memory 502 can include all, or part, of the OS 504 and various modules 506, 508, 510 for the workstation 114, among other things.

The power interface 506 can comprise the interface between the power monitors 110 and the workstation 114. In some examples, the power monitors 110 and the workstation 114 can be in communication via a wired connection (e.g., Ethernet or universal serial bus (USB) cable) or via a wireless connection (e.g., Bluetooth® or Wi-Fi). The power interface 506 can receive current power levels from each power monitor 110 and can associate the power levels with the appropriate UE (e.g., UE(1), UE(2), etc.) for tracking and reporting purposes. In some examples, the power interface 506 can receive a signal from the power monitors 110 proportionate to the power consumption, which is then interpreted by the power interface 506 into data. In other examples, the power monitors 110 can provide the data to the power interface 506 in usable form.

The microcontroller interface 508 can enable the workstation 114 to communication with the microcontroller 116. As mentioned above, this can enable a user to make a selection on the UI 200, for example, which is then sent to each UE 102 in the UE farm 104 via the microcontroller interface 508 and the microcontroller 116. The microcontroller interface 508 can communicate with the microcontroller 116 via a wired or wireless connection and can comprise the necessary software to enable the workstation 114 and microcontroller 116 to work in concert.

The reporting module 510 can comprise a software package including one or more modules to receive and interpret data from the power monitors, via the power interface 506. The reporting module 510 can receive raw data, for example, calculate average and instantaneous consumption, create reports and graphs, etc. Examples of the output of the reporting module 510 are discussed below with reference to FIGS. 6 and 7.

The workstation 114 may also include additional data storage devices (removable and/or non-removable) such as, for example, magnetic disks, optical disks, or tape. Such additional storage is illustrated in FIG. 5 by removable storage 514 and non-removable storage 516. The removable storage 514 and non-removable storage 516 can store at least some of the system 100, various modules 504, 506, 508, 510, UIs 200, 600, 700, and method 300 discussed herein. This can enable the workstation 114 to be fully or partially configured and to present welcome screens, setup menus, GUIs, and other functions to the user.

Non-transitory computer-readable media may include volatile and nonvolatile, removable and non-removable tangible, physical media implemented in technology for storage of information, such as computer readable instructions, data structures, program modules, or other data. The memory 502, removable storage 514, and non-removable storage 516 are all examples of non-transitory computer-readable media. Non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other tangible, physical medium which can be used to store the desired information and which can be accessed by the workstation 114. Any such non-transitory computer-readable media may be part of the workstation 114 or may be a separate database, databank, remote server, or cloud-based server.

In some implementations, the transceiver(s) 518 include any sort of transceivers known in the art. In some examples, the transceiver(s) 518 can include wireless modem(s) to facilitate wireless connectivity with the other UEs, the Internet, and/or an intranet via a cellular connection. Further, the transceiver(s) 518 may include a radio transceiver that performs the function of transmitting and receiving radio frequency communications via an antenna (e.g., Wi-Fi or Bluetooth®). In other examples, the transceiver(s) 518 may include wired communication components, such as a wired modem or Ethernet port, for communicating with the other UEs or the provider's Internet-based network.

In some implementations, the output device(s) 520 include any sort of output devices known in the art, such as a display (e.g., a liquid crystal or thin-film transistor (TFT) display), a touchscreen display (e.g., the monitor 120), speakers, a vibrating mechanism, or a tactile feedback mechanism. In some examples, the output devices can play various sounds based on, for example, whether the workstation 114 is connected to a network, the type of call being received (e.g., video calls vs. voice calls), the number of active calls, etc. Output device(s) 520 also include ports for one or more peripheral devices, such as headphones, peripheral speakers, or a peripheral display.

In various implementations, input device(s) 522 include any sort of input devices known in the art. For example, the input device(s) 522 may include a camera, a microphone, a keyboard/keypad (e.g., keyboard 118), or a touch-sensitive display (e.g., monitor 120). A keyboard/keypad may be a standard push button alphanumeric, multi-key keyboard (such as a conventional QWERTY keyboard), virtual controls on a touchscreen, or one or more other types of keys or buttons, and may also include a joystick, wheel, and/or designated navigation buttons, or the like.

Figure 6:
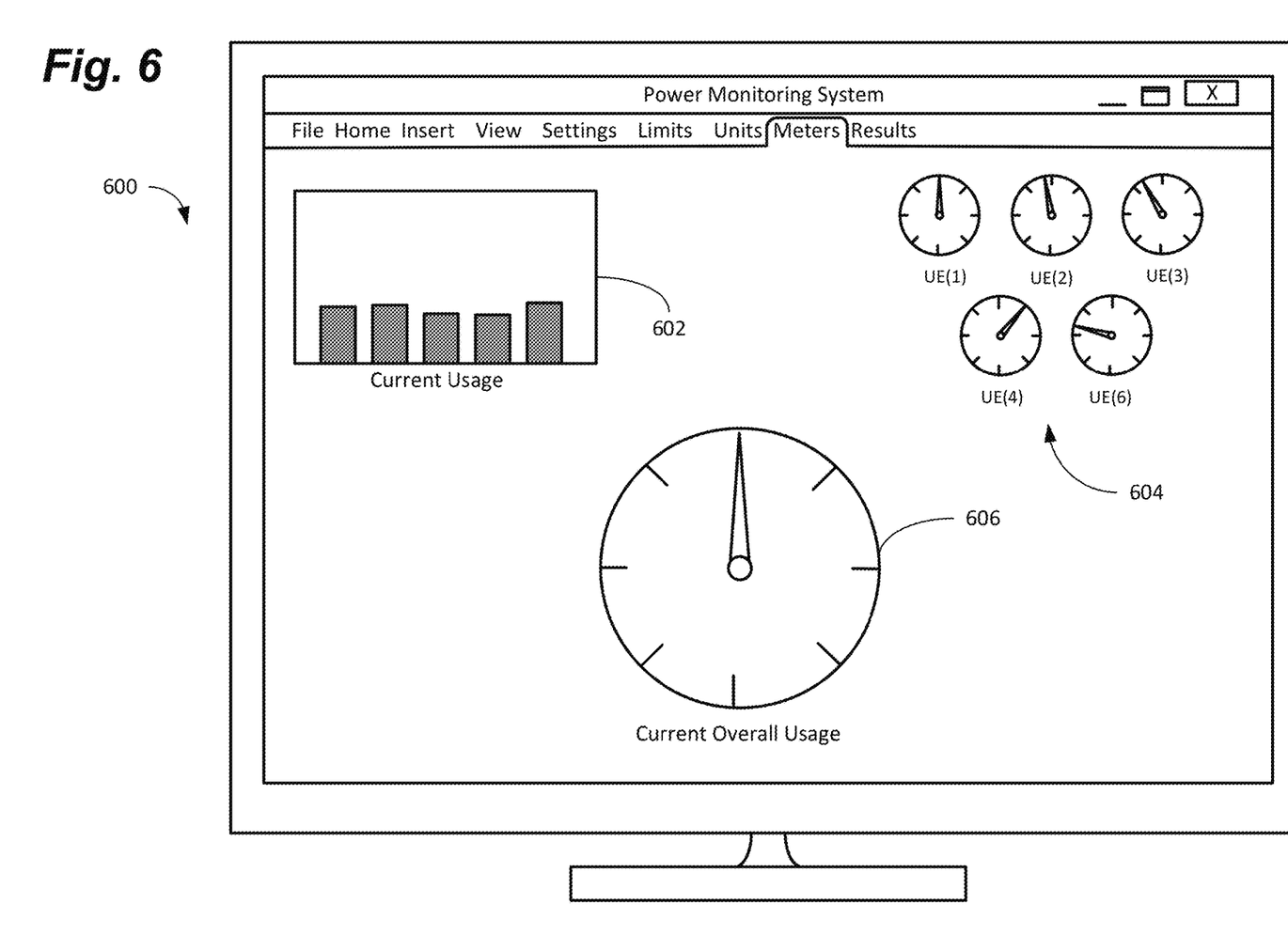
FIG. 6 depicts an example of a second GUI to provide instantaneous consumption data to the user as provided by the system of FIG. 1, in accordance with some examples of the present disclosure.

Examples of the present disclosure can also comprise an instantaneous GUI 600 for monitoring instantaneous power consumption for all of the UEs 102 in the UE farm 104. In some examples, the instantaneous GUI 600 include a variety of graphical representations including, for example, a bar graph 602, individual power meters 604, and an overall power meter 606. As the name implies, the bar graph 602 can include a representation of the instantaneous power consumption for each UE 102 side-by-side in a single graph. This may be useful, for example, to identify anomalies (e.g., a UE 102 that is significantly higher or lower than the other UEs 102) and/or malfunctions (e.g., a UE 102 that has failed to execute a command).

In other examples, the instantaneous GUI 600 can include individual power meters 604 for each UE 102. This can also enable the comparison of each UE 102. Thus, a user may wish to send a command to send a text message to a single UE 102, for example, and observe the change in energy consumption of the single UE 102 to the other UEs 102. As with the bar graph 602, the individual power meters 604 can also help to identify a single UE 102 that is caught in a loop, for example, or otherwise malfunctioning—e.g., one individual power meter 604 is "pegged."

The instantaneous GUI 600 can also comprise an overall power meter 606. The overall power meter 606 can display the instantaneous overall consumption of all of the UEs 102 in the UE farm 104. This may be useful, for example, to take a "baseline" reading for the UE farm 104 and then send a command for instantaneous execution by all of the UEs 102 in the UE farm 104. This tends to average any differences between the UEs 102 and smooth the data. This can also enable the user to observe subtle power changes that might be difficult, or impossible, to detect on the individual power meters 604. In other words, the change in consumption is only obvious when aggregated across the entire UE farm 104.

Figure 7:
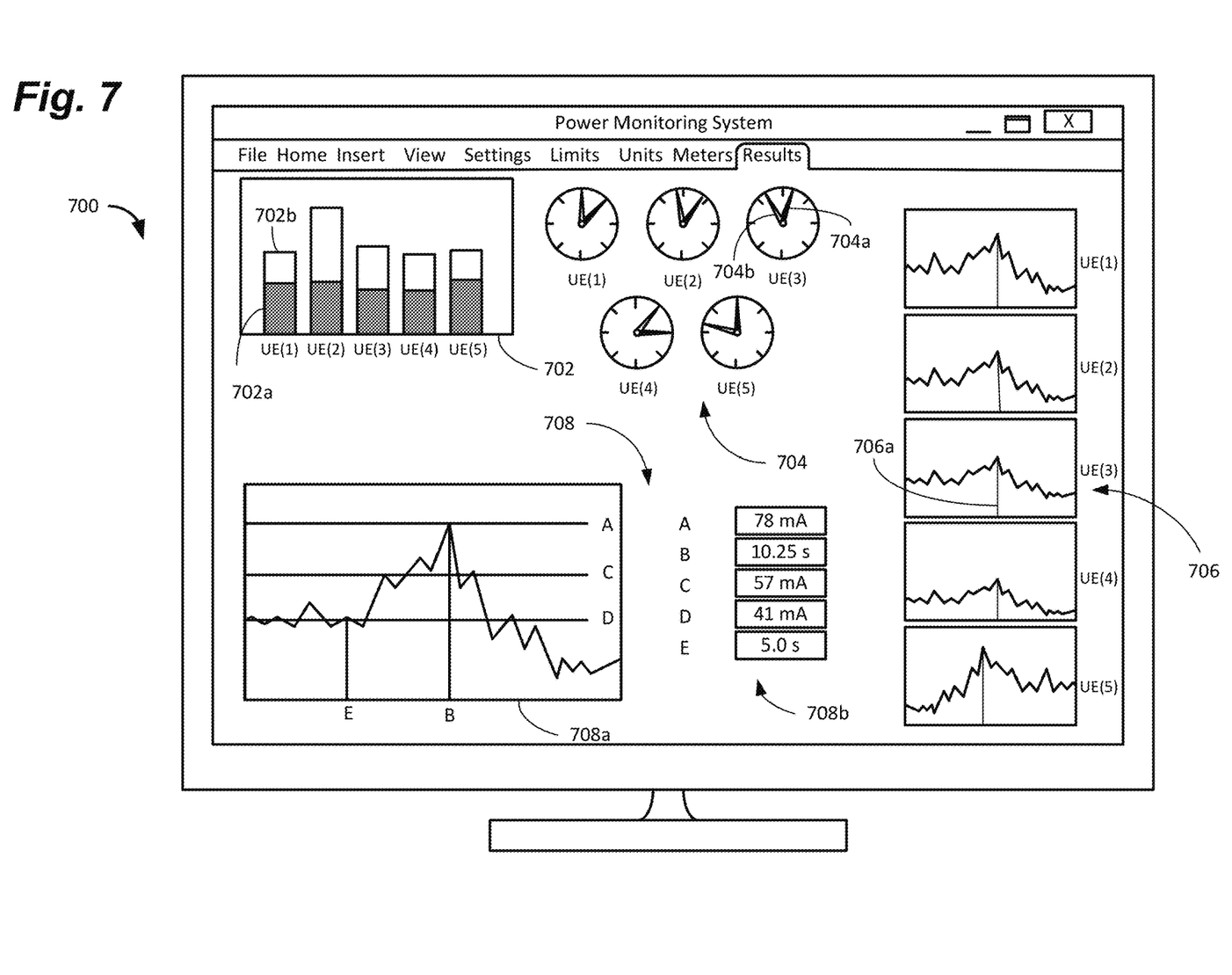
FIG. 7 depicts an example of a third GUI to provide average consumption data and reporting to the user as provided by the system of FIG. 1, in accordance with some examples of the present disclosure.

Examples of the present disclosure can also comprise a reporting GUI 700. As the name implies, the reporting GUI 700 can provide average or overall reports, reports, summaries, and other information based on a longer sample time than the instantaneous GUI 600. To this end, the reporting GUI 700 can provide an overview bar graph 702. In some examples, the overview bar graph 702 can comprise a first component 702a representative of average consumption, for example, and a second component 702b representative of overall consumption. Once again, the user can identify anomalies quickly in comparison to the other "normal" UEs 102. In other examples, the first component 702a can represent average consumption, for example, and the second component 702b can represent instantaneous consumption. This can enable the GUI 700 to graphically depict changes in consumption due to the execution of a command, for example.

The reporting GUI 700 can also comprise a plurality of averaged power meters 704—one for each UE 102 in the UE farm 104. The averaged power meters 704 may simulate analog gauges, as shown, or take some other form. Similar to the overview bar graph 702, the averaged power meters 704 can include a first indicator 704a (in this case a "needle") that can represent average consumption indicator, for example, and a second indicator 704b that can represent overall consumption. Thus, as a test progresses, the first indicator 704a may tend to settle to a particular value, while the second indicator 704b will continue to rise over time.

In other examples, the first indicator 704a can represent average consumption, for example, while the second indicator 704b can represent peak consumption. This can enable the user to identify spikes in consumption caused by opening a new app, for example, or transmitting an e-mail. A spike significantly higher on a particular UE 102 than the remaining UEs 102 in the UE farm 104 can also indicate a problem with UE 102 or the test.

The reporting GUI 700 can also include a plurality of individual consumption graphs 706. As the name implies, the individual consumption graphs 706 can represent the consumption for each UE 102 plotted (in this case, along the Y-axis) against time (in this case, along the X-axis). This can enable the user to identify peaks in consumption caused by the UEs 102 opening an app, for example, or connecting a voice call. In some examples, such as when the commands are sent sequentially, the individual consumption graphs 706 may also include a marker 706a indicating when the command was sent from the system 100 to the UE 102, for example, or when the task was actually performed by the UE 102.

The reporting GUI 700 can also include an aggregated consumption graph 708. In some examples, the aggregated consumption graph 708 can include a graphical component 708a and a table 708b. As shown, the graphical component 708a can graph the overall consumption for all UEs 102 in the UE farm 104 over time. In some examples, the table 708b can include additional information such as, for example, peak overall consumption A, which may also be delineated on the graphical component 708a. In some examples, the graphical component 708a can also include a marker B, which can mark the time at which peak overall consumption A occurred. In other examples, marker B can identify a time at which the system 100 send a command to the UEs 102, which may or may not coincide with peak overall consumption A. The exact time for marker B may also be included in the table 708b—in this case, the peak occurred, or the command was sent, 10.25 seconds into the test. Indeed, in most examples, marker B would precede peak overall consumption A because some time is required for the UEs 102 to receive and execute the command.

In some examples, the graphical component 708a of the aggregated consumption graph 708 can also include the overall average consumption C of the UE farm 104 for the test period. In some examples, the exact overall average consumption C may also be provided in the table 708b—in this case 57 mA.

In some examples, the aggregated consumption graph 708 can include a line delineating average idle consumption D for the UE farm 104, which may also be provided in the table 708b—in this case 41 mA. The average idle consumption D represents the average consumption of the UEs 102 when running only a "baseline" of applications. In some examples, this can include, for example, the UE 102 in the out-of-the-box configuration, with no additional apps running, no tasks being performed, and all transceivers in idle mode. This can enable the comparison of the consumption of the UE farm 104 before performing the task sent by the system 100 to the consumption of the UE farm 104 during and after the task is performed, among other things.

In some examples, the aggregated consumption graph 708 can include a line delineating when the average idle consumption D was calculated, which may also be provided in the table 708b—in this case 5 seconds after the test began. Of course, in some examples, the average idle consumption D may be taken over a particular time period (e.g., the first five seconds of the test), with the line delineating the end of the test period and the table 708b indicating the length of time the average idle consumption D—e.g., "for" 5 seconds instead of "at" 5 seconds.

Examples of the present disclosure can enable the monitoring, recording, and reporting of energy consumption for the UE farm 104. The system 100 can also enable commands to be sent centrally and/or automatically from a workstation 114 to each UE 102 in the UE farm 104. Unlike conventional power monitoring systems, the use of external, individual power monitors can enable the power consumption of each UE 102 to be monitored at the device level including all components of the UE 102, such as hardware, software, environment, and conflicts there between.

While several possible examples are disclosed above, examples of the present disclosure are not so limited. For instance, while the systems and methods above are discussed with reference to use with cellular phones and tasks associated therewith, the systems and methods can be used with other types of electronic devices that perform similar, or completely different, tasks. Similarly, the system 100 is depicted with five UEs 102; however, the system 100 could be used with more or less UEs 102 than are shown. In addition, while the various controls and buttons are generally shown as selectable buttons on a touchscreen on the workstation 114, for example, these controls and buttons could easily be inputs from actual, physical buttons, voice commands, or other types of interfaces on the workstation 114 or associated with the workstation 114 or microcontroller 116.

The specific configurations, machines, and the size and shape of various elements can be varied according to particular design specifications or constraints requiring a GUI, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:
1. A system comprising:
a plurality of user equipment (UEs);

a plurality of power monitors, each power monitor in communication with one of the plurality of UEs and a power source, to provide power to the plurality of UEs and to measure a power consumption of the plurality of UEs;

a microcontroller in communication with the plurality of UEs to send one or more commands to the plurality of UEs to cause the plurality of UEs to perform a plurality of tasks; and a workstation, in communication with at least the microcontroller and the plurality of power monitors, and comprising:

a touchscreen;

an interface emulating a graphic user interface (GUI) of a UE (UE GUI) on the touchscreen, the interface enabling one or more tasks to be selected by touching one or more icons displayed on the emulated UE GUI corresponding to icons displayed on the UE;

a microcontroller interface to enable the workstation to send the one or more tasks to the microcontroller; and a power interface to enable the workstation to receive a signal from each of the plurality of power monitors indicating a power consumption of each respective UE, wherein the signal is indicative of a power consumption associated with the respective UE, wherein the touchscreen further displays, based on the signals form the plurality of UEs, power consumption of each of the plurality of UEs and an overall power consumption of all of the plurality of UEs at a same time.

2. The system of claim 1, wherein the one or more tasks comprise one or more of sending a text message, sending an e-mail, placing a voice call, or browsing the Internet.

3. The system of claim 1, wherein the interface comprises an application programming interface (API).

4. The system of claim 1, wherein the signal comprises data associated with the plurality of UEs, the data comprising: an average idle power consumption, an average power consumption, and a peak power consumption.

5. The system of claim 1, wherein the interface and the microcontroller enable control of the plurality of UEs using the UE GUI on the workstation.

6. The system of claim 1, wherein the interface and the microcontroller are configured to enable control of the plurality of UEs simultaneously, sequentially, or both simultaneously and sequentially.

7. A method comprising:

receiving, at a workstation, a selection of a plurality of tasks via a user interface (UI) displayed on a touchscreen of the workstation, the UI emulating a graphic user interface (GUI) of a user equipment (UE) (UE GUI), the selection of the plurality of tasks made by touching a plurality of icons displayed on the emulated UE GUI corresponding to icons displayed on the UE;

receiving, via the UI, one or more additional inputs regarding an execution of the plurality of tasks;

receiving, at a power interface of the workstation, a first set of inputs from a plurality of power monitors, each power monitor in communication with a respective UE of a plurality of UEs, the first set of inputs indicating an average idle power consumption of each of the respective UEs;

sending, from the workstation to one or more microcontrollers, one or more signals associated with the plurality of tasks, the one or more signals indicative of a power consumption associated with the respective UE;

sending, from the one or more microcontrollers to the plurality of UEs, one or more commands in response to the one or more signals from the workstation, the one or more commands to cause the plurality of UEs to perform the plurality of tasks;

receiving, at the power interface of the workstation, a second set of inputs from the plurality of power monitors indicating a power consumption of each of the respective UEs of the plurality of UEs after receiving the one or more commands from the one or more microcontrollers; and displaying on the touchscreen, based on the second set of inputs, power consumption of each of the plurality of UEs and an overall power consumption of all of the plurality of UEs at a same time.

8. The method of claim 7, wherein receiving one or more additional inputs from the user via the UI regarding the execution of the one or more tasks comprises receiving a delay input to cause a predetermined delay between each UE of the plurality of UEs executing the one or more tasks and each subsequent UE of the plurality of UEs executing the one or more tasks.

9. The method of claim 8, wherein the user setting the delay input to zero causes all of the UEs of the plurality of UEs to execute the one or more tasks simultaneously.

10. The method of claim 7, wherein receiving one or more additional inputs from the user via the UI regarding the execution of the one or more tasks comprises receiving sample input designating a first group of UEs of the plurality of UEs to perform the one or more tasks.

11. The method of claim 7, wherein receiving one or more additional inputs from the user via the UI regarding the execution of the one or more tasks comprises receiving a cycle input designating a number of times each of the plurality of UEs are to perform the one or more tasks.

12. The method of claim 7, further comprising:

receiving, at the UI, a selection of a simultaneous execution control;

wherein the simultaneous execution control causes the plurality of UEs to execute all of the tasks of the one or more tasks simultaneously.

13. The method of claim 7, further comprising:

receiving, at the UI, a selection of a sequential execution control;

wherein the sequential execution control causes the plurality of UEs to execute the one or more tasks sequentially.

14. A computing device comprising:

a touchscreen display;

one or more processors;

one or more memory storage devices; and a user interface (UI) stored in the one or more memory storage devices and executable by the one or more processors, to generate data for display on the touchscreen display, the interface comprising:

a task selector to enable a user to select a plurality of tasks to be performed by a plurality of user equipment (UEs) in a UE farm by touching a plurality of icons displayed in an emulated UE graphic user interface (UE GUI) on the touchscreen corresponding to icons displayed on a UE of the plurality of UEs, the task selector emulating the UE GUI on the touchscreen display;

a delay input to enable the user to enter a delay between the plurality of tasks being performed on each UE and each subsequent UE in the UE farm;

a sample input to enable the user to select a predetermined number of UEs of the plurality of UEs in the UE farm to perform the plurality of tasks; and a power interface to enable the computing device to receive a signal from each of a plurality of power monitors, the signal indicating a power consumption of a corresponding UE of the plurality of UEs in the UE farm, each power monitor of the plurality of power monitors being in communication with the corresponding UE the plurality of UEs in the UE farm, wherein the computing device communicates with a microcontroller in communication with the UE farm and the microcontroller sends a signal to each UE of the plurality of UEs in the UE farm to cause each UE to perform the plurality of tasks, wherein the signal is indicative of a power consumption associated with the respective UE, and wherein the touchscreen displays, based on the signal from each of the plurality of power monitors, power consumption of each of the plurality of UEs and an overall power consumption of all of the plurality of UEs at a same time.

15. The computing device of claim 14, wherein the interface comprises an application programming interface (API) to enable the user to generate a program including the task selector, the delay input, and the sample input; and wherein the API automatically causes the microcontroller to send the signal to each UE in the UE farm to cause each UE to perform the one or more tasks for a predetermined amount of time, at a predetermined time every day, or continuously until interrupted by the user.

16. The computing device of claim 14, wherein the UI further comprises:

a sample input to enable the user to select a predetermined number of times each of the UEs in the UE farm perform the one or more tasks.

17. The computing device of claim 14, wherein the UI further comprises:

a task sequence list to enable the user to select two or more tasks to be performed by the UE farm.

18. The computing device of claim 17, wherein the UI further comprises:

a simultaneous control to cause all of the UEs in the UE farm to perform the two or more tasks simultaneously; and a sequential control to cause all of the UEs in the UE farm to perform the two or more tasks sequentially.

* * * * *